Patented Feb. 21, 1933

1,898,917

UNITED STATES PATENT OFFICE

HEINRICH WACHWITZ, OF NUREMBERG, GERMANY, ASSIGNOR TO VEREINIGTE SILBERHAMMERWERKE HETZEL & CO., OF NUREMBERG, GERMANY, A JOINT-STOCK COMPANY OF GERMANY

PROCESS OF WELDING ALUMINIUM OR ALLOYS THEREOF TO OTHER METALS

No Drawing. Application filed September 28, 1929, Serial No. 395,998, and in Germany October 3, 1928.

My invention relates to improvements in the process of connecting aluminium or aluminium alloys with other metals, and the object of the improvements is to provide a process by means of which the said metals are intimately connected with each other. As is known in the art, for producing an intimate connection between aluminium or aluminium alloys with other metals it is necessary to heat the metals at welding temperature. However, when heated to welding temperature the metal is subject to oxidation preventing intimate connection of the metal with the aluminium or its alloy. I have discovered that when applying, to the surface of the metal, aluminium oxide in the form of a coherent foil the said metal can be heated in the open air at welding temperature without oxidation of the metal or formation of scale. Therefore my invention consists in coating the basic metal with aluminium oxide, heating the coated metal and the aluminium or aluminium alloy to be united thereto at welding temperature, and combining the metals under pressure, preferably by passing the same through a rolling mill. It is important that in the aluminium oxide applied to the metal the oxide be directly connected to the surface of the basic metal, and that no aluminium be on the basic metal. The pressure of the rolling mill must be such that the layer of aluminium oxide is broken, and it depends on the dimensions and the properties of the metals. Thus at the moment of breaking up the layer of oxide by the pressure of the rolls and the welding heat the metals are intimately combined and welded.

By my improved process also several layers of metal alternately consisting of aluminium or aluminium alloy and other metals may be combined, and the metals may have any desired thickness. Preferably the metals are combined in thick form, because after plating they can be readily reduced by rolling to the desired size.

An important feature of the process consists in that an absolutely intimate plating of the metals and the aluminium or aluminium alloys is insured by welding, that the metals can be worked with any ratio of thickness, and that the blanks may have any desired size.

I claim:

The herein described process of combining aluminium with other metals, which consists in first coating the basic metal with aluminium oxide, heating the oxide coated metal and the aluminium to welding temperature, and combining the metals by pressure sufficient to break up the layer of aluminium oxide and to weld the metals together.

In testimony whereof I hereunto affix my signature.

HEINRICH WACHWITZ.